United States Patent
Zhang et al.

(10) Patent No.: US 11,889,323 B2
(45) Date of Patent: Jan. 30, 2024

(54) DERIVATION OF RESOURCE LOCATIONS FOR FULL DUPLEX BEAM FAILURE DETECTION

(71) Applicant: QUALCOMM Incorporated, San Diego, CA (US)

(72) Inventors: Qian Zhang, Basking Ridge, NJ (US); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 102 days.

(21) Appl. No.: 17/470,220

(22) Filed: Sep. 9, 2021

(65) Prior Publication Data

US 2022/0086658 A1   Mar. 17, 2022

Related U.S. Application Data

(60) Provisional application No. 63/079,388, filed on Sep. 16, 2020.

(51) Int. Cl.
*H04W 16/28* (2009.01)
*H04W 24/10* (2009.01)
*H04L 5/14* (2006.01)
*H04B 17/336* (2015.01)
*H04W 76/19* (2018.01)
*H04L 5/00* (2006.01)

(52) U.S. Cl.
CPC .......... *H04W 16/28* (2013.01); *H04B 17/336* (2015.01); *H04L 5/0051* (2013.01); *H04L 5/14* (2013.01); *H04W 24/10* (2013.01); *H04W 76/19* (2018.02)

(58) Field of Classification Search
None
See application file for complete search history.

(56) References Cited

U.S. PATENT DOCUMENTS

2022/0190906 A1* 6/2022 Haghighat ........ H04W 74/0841
2022/0302989 A1* 9/2022 Zhang .................. H04B 7/0695

* cited by examiner

*Primary Examiner* — Scott M Sciacca
(74) *Attorney, Agent, or Firm* — Procopio, Cory, Hargreaves & Savitch LLP

(57) ABSTRACT

A User equipment (UE) receives a control resource set (CORESET) configuration for a full duplex CORESET. The UE performs a measurement for full duplex operation based on at least one of a downlink beam or an uplink beam for full duplex beam failure detection based on one or more quasi co-location (QCL) relationships to one or more transmission configuration indication (TCI) states of the CORESET based on an absence of a configuration of a reference signal for the full duplex beam failure detection.

25 Claims, 12 Drawing Sheets

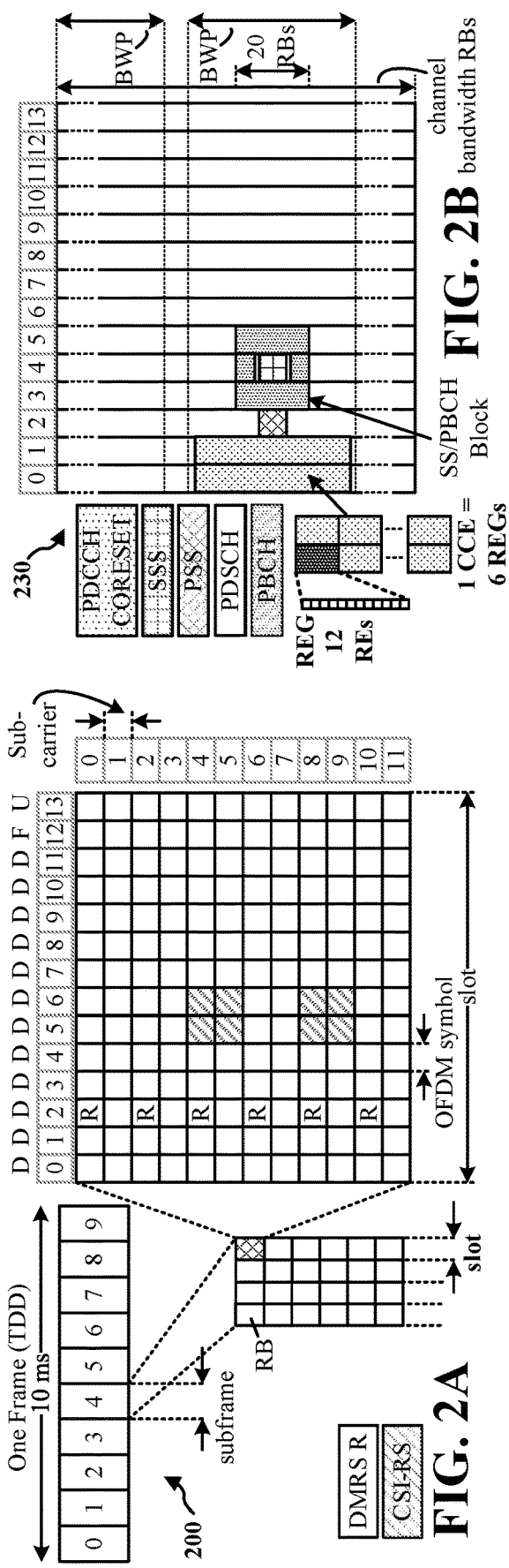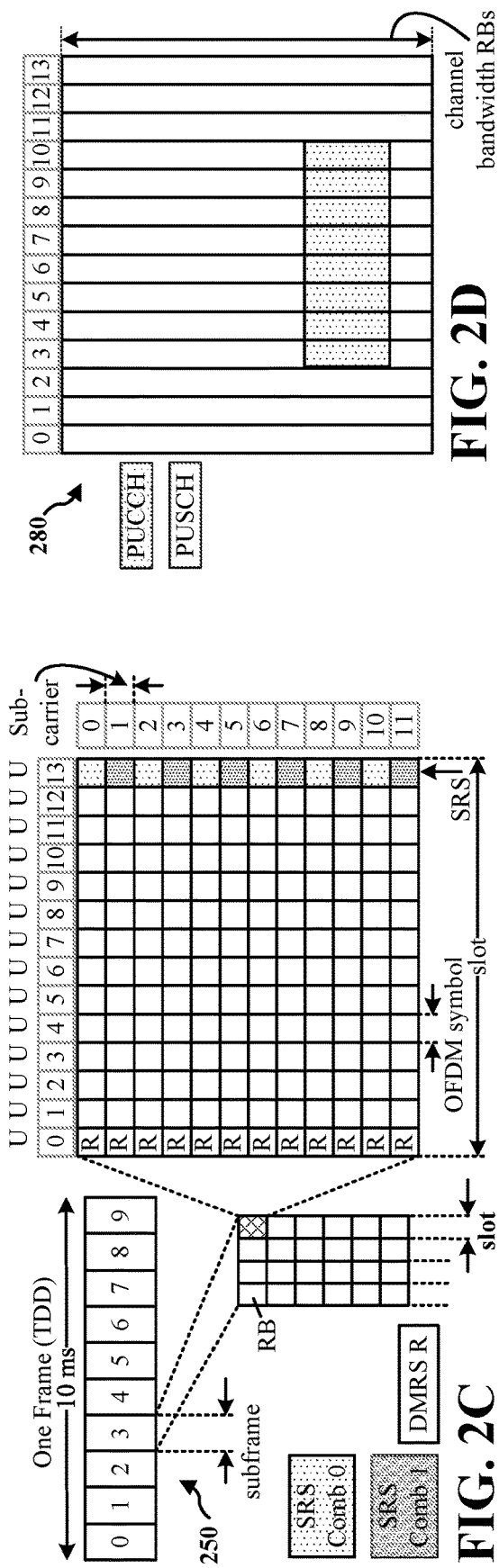

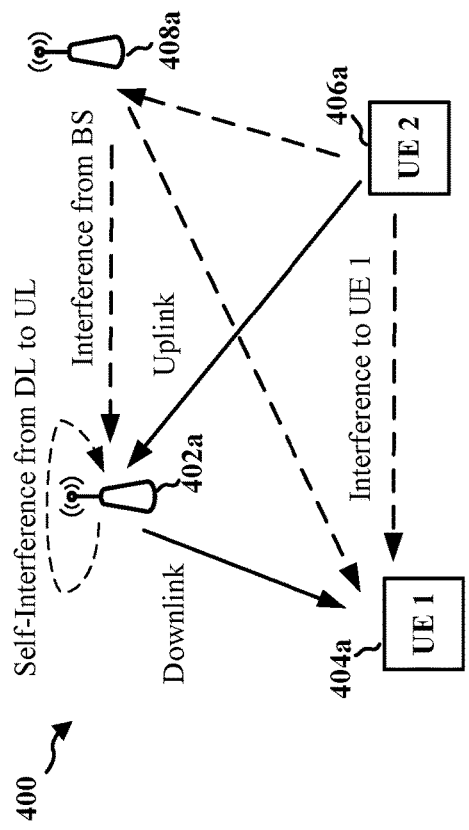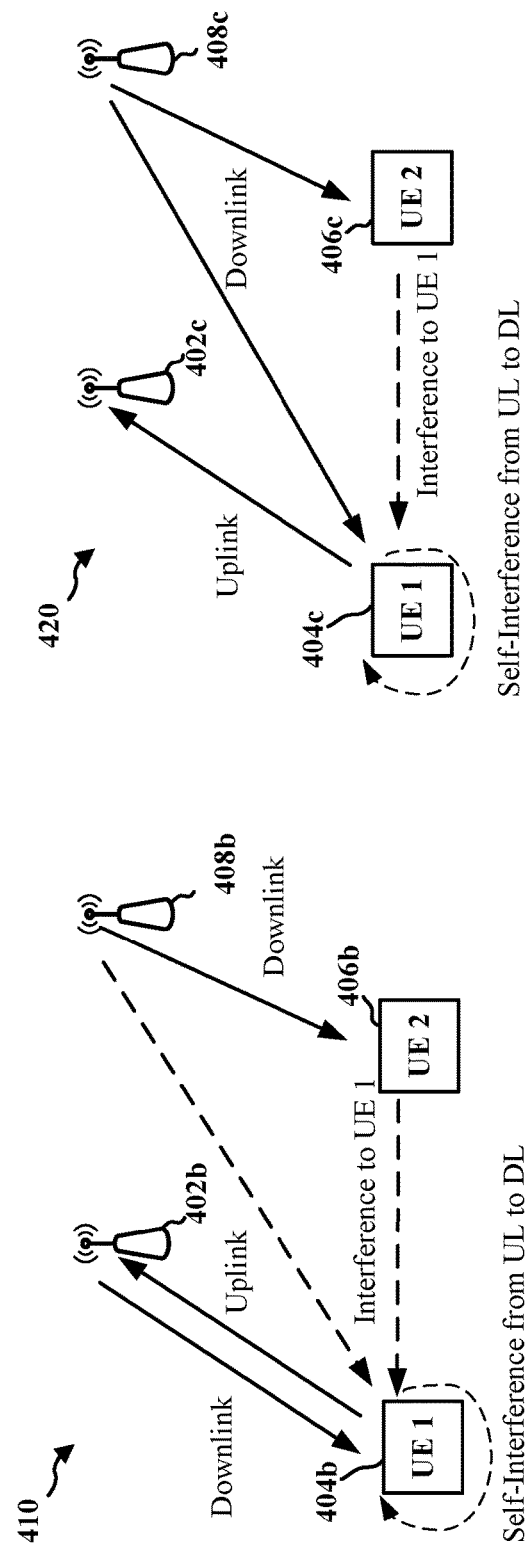
FIG. 4A
FIG. 4B
FIG. 4C

DERIVATION OF RESOURCE LOCATIONS FOR FULL DUPLEX BEAM FAILURE DETECTION

CROSS REFERENCE TO RELATED APPLICATION(S)

This application claims the benefit of and priority to U.S. Provisional Application Ser. No. 63/079,388, entitled "Derivation of Resource Locations for Full Duplex Beam Failure Detection" and filed on Sep. 16, 2020, which is expressly incorporated by reference herein in its entirety.

TECHNICAL FIELD

The present disclosure relates generally to communication systems, and more particularly, to wireless communication based on directional beams.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for performing full duplex beam failure detection at a user equipment (UE). The apparatus is configured to receives a control resource set (CORESET) configuration for a full duplex CORESET. The apparatus is configured to perform a measurement for full duplex operation based on at least one of a downlink beam or an uplink beam for full duplex beam failure detection based on one or more quasi co-location (QCL) relationships to one or more transmission configuration indication (TCI) states of the CORESET based on an absence of a configuration of a reference signal for the full duplex beam failure detection.

In an aspect of the disclosure, a method, a computer-readable medium, and an apparatus are provided for enabling full duplex beam failure detection by a base station. The apparatus is configured to configure a full duplex CORESET for a UE associated with one or more TCI states and receive an indication of a beam failure for full duplex communication at the UE based on at least one of at least one downlink beam and at least one uplink beam having one or more QCL relationships to one or more TCI states of the full duplex CORESET.

To the accomplishment of the foregoing and related ends, the one or more aspects comprise the features hereinafter fully described and particularly pointed out in the claims. The following description and the annexed drawings set forth illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

FIGS. 4A, 4B, and 4C illustrate example diagrams of full duplex wireless communication.

DETAILED DESCRIPTION

Figure 1:
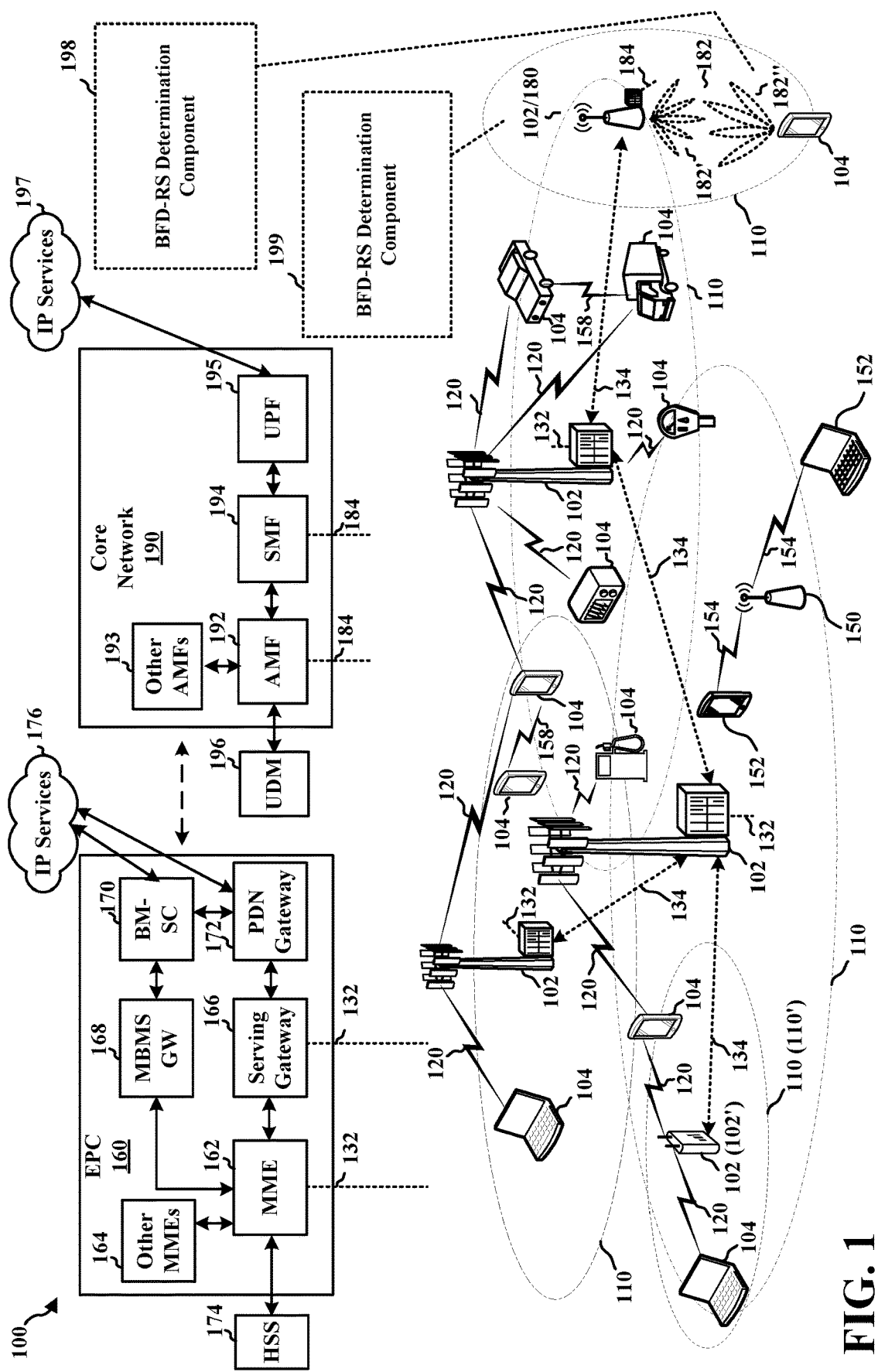
FIG. 1 is a diagram illustrating an example of a wireless communications system and an access network.

A user equipment (UE) and/or a base station may communicate in a full duplex mode in which uplink communication and downlink communication is exchanged in a same frequency band at overlapping times. The UE and the base station may exchange communication using one or more directional beams. A beam between the UE and the base station may become blocked, which may lead to downlink and/or uplink beam degradation leading to a beam failure. A UE or a base station operating in a full duplex mode may experience self-interference for a beam that leads to a beam failure for downlink communication.

The UE may execute Beam Failure Detection (BFD) procedures to identify problems in beam quality and detect beam failures. A UE may monitor the quality of the beam by, for example, performing radio link monitoring (RLM) in order to detect a reduction in the beam quality. RLM parameters may be configured at the UE through an RRC configuration from the base station that defines thresholds, resources, and other parameters for performing the BFD procedure. For example, in the case of full duplex BFD, reference signals for measuring self-interference may be configured. Otherwise the UE may be unable to distinguish between signals contributing to self-interference and other interfering signals (e.g., form a base station). However, if the UE is not configured for full duplex BFD (e.g., the resources for such measurement are not configured), then the UE may be unable to perform full duplex BFD. Accordingly, aspects herein provide for deriving resource locations for full duplex BFD implicitly from a full duplex control resource set (CORESET). For example, resource locations for full duplex BFD may be determined from one or more quasi co-location (QCL) relationships to one or more TCI state of a full duplex CORESET. Based on the derived resource locations, the UE may execute full duplex BFD without requiring configuration of the resources for the procedure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more examples, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Aspects described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described aspects may occur. Implementations may range a spectrum from chip-level or modular components to non-modular, non-chip-level implementations and further to aggregate, distributed, or original equipment manufacturer (OEM) devices or systems incorporating one or more aspects of the described aspects. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that aspects described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Some UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR2-2, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. User Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a Packet Switch (PS) Streaming (PSS) Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. User IP packets are transferred through the UPF 195. The UPF 195 provides UE IP address allocation as well as other functions. The UPF 195 is connected to the IP Services 197. The IP Services 197 may include the Internet, an intranet, an IMS, a PSS Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, the UE 104 may include an beam failure detection reference signal (BFD-RS) determination component 198 configured to determine that a radio link management reference signal (RLM-RS) is not configured for full duplex BFD and derive one or more resource locations for RS from a CORESET. For example, the beam failure detection reference signal (BFD-RS) determination component 198 may be configured to determine at least one DL beam and/or at least one UL beam for the full duplex BFD from one or more quasi co-location (QCL) relationships to one or more transmission configuration indicator (TCI) states of a full duplex CORESET and perform a measurement for full duplex operation based on the at least one of the at least one DL beam and/or the at least one UL beam associated with the QCL relationship. The BFD-RS determination component 198 may also be configured to determine a DL reference signal (RS) for the full duplex BFD based on the DL beam having a QCL Type D relationship to the TCI state of the full duplex CORESET. The BFD-RS determination component 198 may be configured to determine the at least one UL beam paired to the at least one DL beam for the DL RS having the QCL Type D relationship to the TCI state of the full duplex CORESET. To perform the measurement for full duplex operation, in some aspects, the BFD-RS determination component 198 may be configured to measure self-interference on a DL beam based on a RS transmitted on the determined UL beam. The base station 102 or 180 may include a BFD-RS determination component 199 configured to configure a full duplex CORESET associated with one or more TCI states for a UE and receive an indication of a beam failure for full duplex communication at the UE based on at least one DL beam or at least one UL beam having QCL relationships to one or more TCI states of the full duplex CORESET. The indication received by the BFD-RS determination component 199 may be based on at least one DL RS for the full duplex BFD based on the at least one DL beam having a QCL type D relationship to the one or more TCI states of the full duplex CORESET. The BFD-RS determination component 199 may also be configured to configure a measurement gap for the UE to perform self-interference measurements. Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu*15$ kHz, where u is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a CORESET. A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
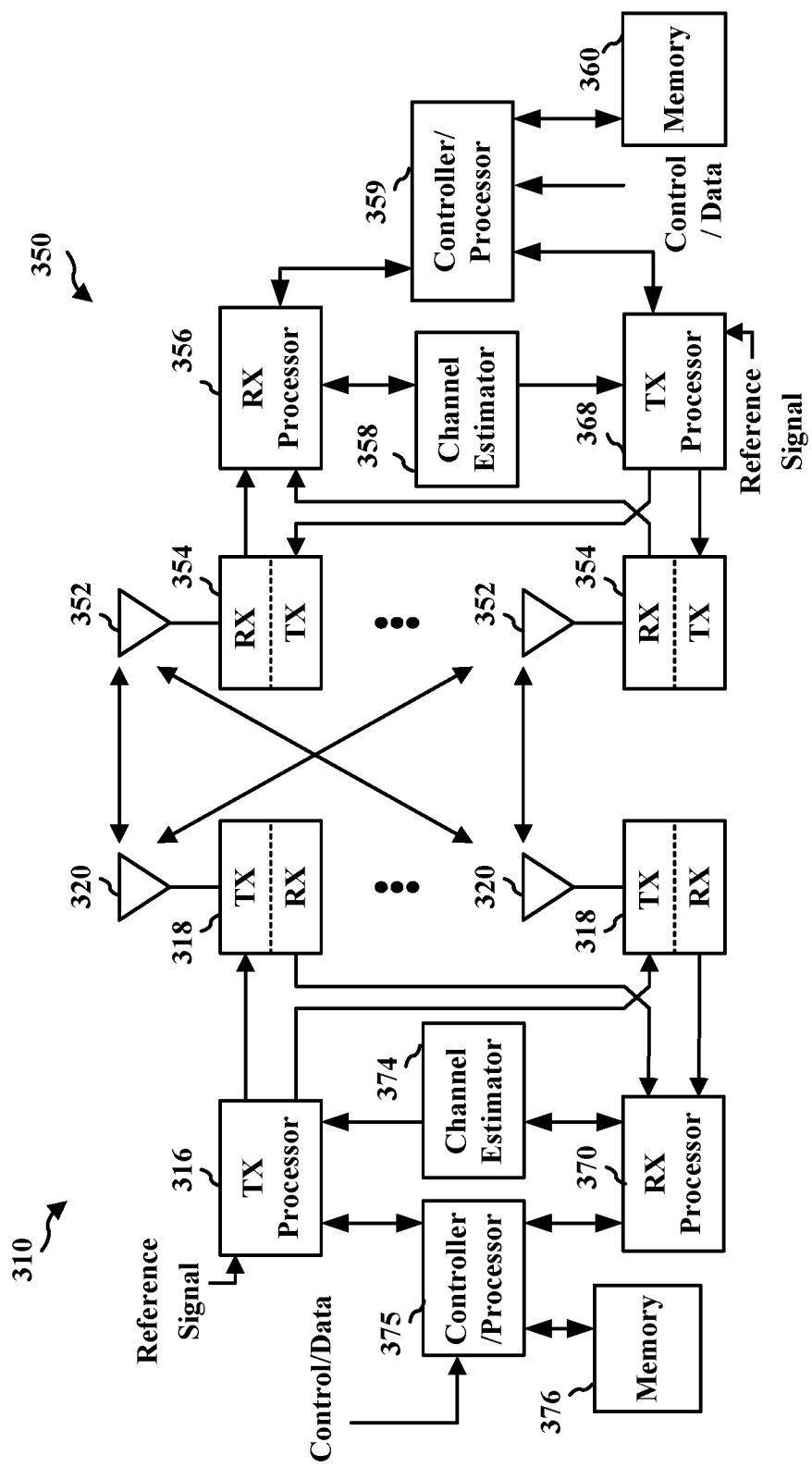
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIB s) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the BFD-RS determination component 198 of FIG. 1.

At least one of the TX processor 316, the RX processor 370, and the controller/processor 375 may be configured to perform aspects in connection with the BFD-RS determination component 199 of FIG. 1.

Wireless communication systems may be configured to share available system resources and provide various telecommunication services (e.g., telephony, video, data, messaging, broadcasts, etc.) based on multiple-access technologies that support communication with multiple users. Full duplex operation in which a wireless device exchanges uplink and downlink communication that overlaps in time may enable more efficient use of the wireless spectrum. Full duplex operation may include simultaneous transmission and reception in a same frequency range. In some examples, the frequency range may be a mmW frequency range, e.g., frequency range 2 (FR2). In some examples, the frequency range may be a sub-6 GHz frequency range, e.g., frequency range 1 (FR1). Full duplex communication may reduce latency. For example, full duplex operation may enable a UE to receive a downlink signal in an uplink only slot, which can reduce the latency for the downlink communication. Full duplex communication may improve spectrum efficiency, e.g., spectrum efficiency per cell or per UE. Full duplex communication may enable more efficient use of wireless resources.

FIGS. 4A-4C illustrate various modes of full duplex communication. Full duplex communication supports transmission and reception of information over a same frequency band in manner that overlap in time. In this manner, spectral efficiency may be improved with respect to the spectral efficiency of half-duplex communication, which supports transmission or reception of information in one direction at a time without overlapping uplink and downlink communication. Due to the simultaneous Tx/Rx nature of full duplex communication, a UE or a base station may experience self-interference caused by signal leakage from its local transmitter to its local receiver. In addition, the UE or base station may also experience interference from other devices, such as transmissions from a second UE or a second base station. Such interference (e.g., self-interference or interference caused by other devices) may impact the quality of the communication, or even lead to a loss of information.

FIG. 4A shows a first example of full duplex communication 400 in which a first base station 402a is in full duplex communication with a first UE 404a and a second UE 406a. The first UE 404a and the second UE 406a may be configured for half-duplex communication or full-duplex communication. FIG. 4A illustrates the first UE 404a performing downlink reception, and the second UE 406a performing uplink transmission. The second UE 406a may transmit a first uplink signal to the first base station 402a as well as to other base stations, such as a second base station 408a in proximity to the second UE 406a. The first base station 402a transmits a downlink signal to the first UE 404a concurrently (e.g., overlapping at least partially in time) with receiving the uplink signal from the second UE 406a. The base station 402a may experience self-interference at its receiving antenna that is receiving the uplink signal from UE 406a, the self-interference being due to reception of at least part of the downlink signal transmitted to the UE 404a. The base station 402a may experience additional interference due to signals from the second base station 408a. Interference may also occur at the first UE 404a based on signals from the second base station 408a as well as from uplink signals from the second UE 406a.

FIG. 4B shows a second example of full-duplex communication 410 in which a first base station 402b is in full-duplex communication with a first UE 404b. In this example, the UE 404b is also operating in a full-duplex mode. The first base station 402b and the UE 404b receive and transmit communication that overlaps in time and is in a same frequency band. The base station and the UE may each experience self-interference, due to a transmitted signal from the device leaking to (e.g., being received by) a receiver at the same device. The first UE 404b may experience additional interference based on one or more signals emitted from a second UE 406b and/or a second base station 408b in proximity to the first UE 404b.

FIG. 4C shows a third example of full-duplex communication 420 in which a first UE 404c transmits and receives full-duplex communication with a first base station 402c and a second base station 408c. The first base station 402c and the second base station 408c may serve as multiple transmission and reception points (multi-TRPs) for UL and DL communication with the UE 404c. The second base station 408c may also exchange communication with a second UE 406c. In FIG. 4C, the first UE 404c may transmit an uplink signal to the first base station 402c that overlaps in time with receiving a downlink signal from the second base station 408c. The first UE 404c may experience self-interference as a result of receiving at least a portion of the first signal when receiving the second signal, e.g., the UE's uplink signal to the base station 402c may leak to (e.g., be received by) the UE's receiver when the UE is attempting to receive the signal from the other base station 408c. The first UE 404c may experience additional interference from the second UE 406c.

Figure 5:
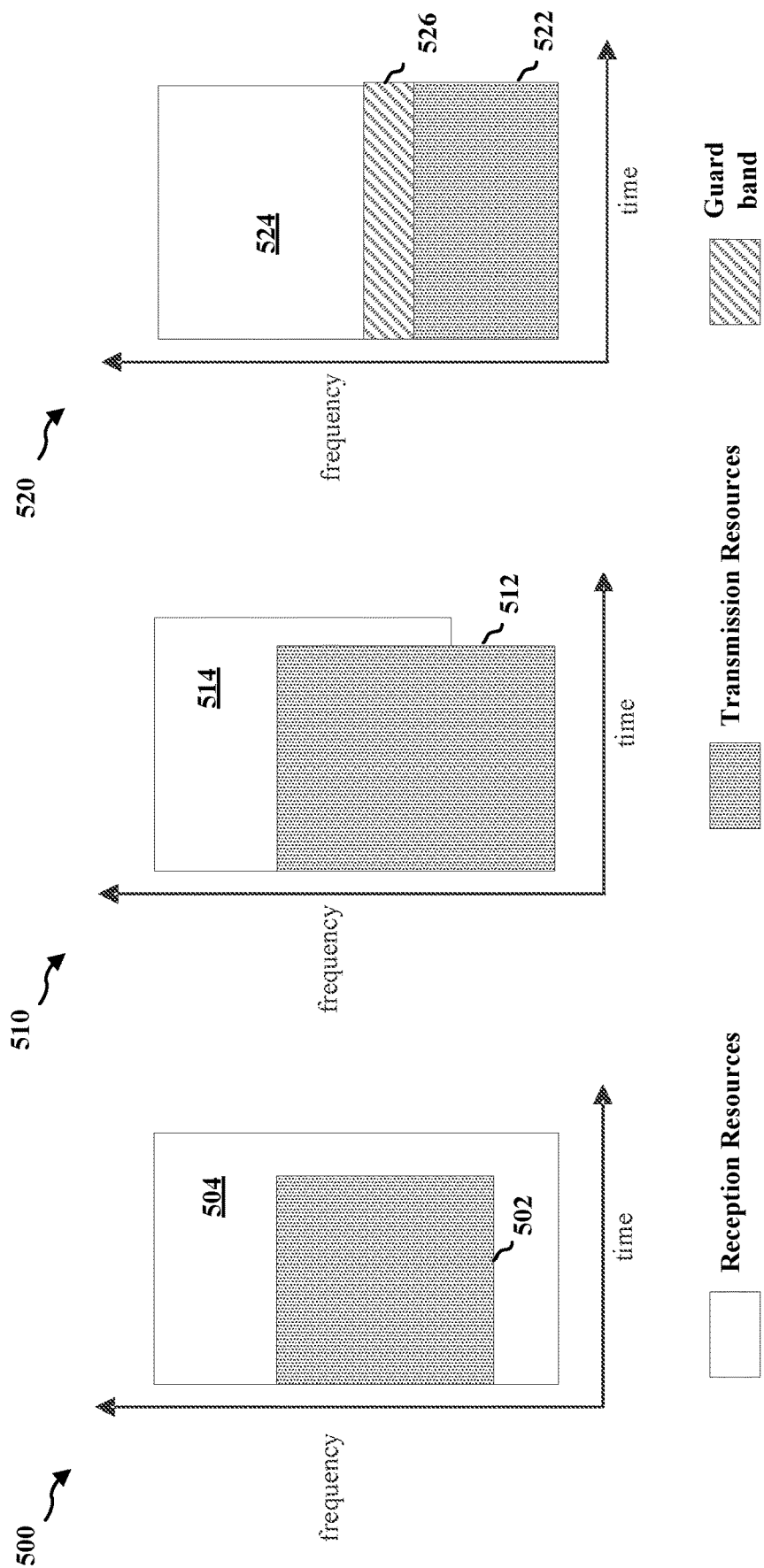
FIG. 5 illustrates examples of in-band full duplex (IBFD) resources and sub-band frequency division duplex (FDD) resources for full duplex communication.

Full duplex communication may be in a same frequency band. The uplink and downlink communication may be in different frequency subbands, in the same frequency subband, or in partially overlapping frequency subbands. FIG. 5 illustrates a first example 500 and a second example 510 of in-band full-duplex (IBFD) resources and a third example 520 of sub-band full-duplex resources. In IBFD, signals may be transmitted and received in overlapping times and overlapping in frequency. As shown in the first example 500, a time and a frequency allocation of transmission resources 502 may fully overlap with a time and a frequency allocation of reception resources 504. In the second example 510, a time and a frequency allocation of transmission resources 512 may partially overlap with a time and a frequency of allocation of reception resources 514.

IBFD is in contrast to sub-band FDD, where transmission and reception resources may overlap in time using different frequencies, as shown in the third example 520. In the third example 520, the UL, the transmission resources 522 are separated from the reception resources 524 by a guard band 526. The guard band may be frequency resources, or a gap in frequency resources, provided between the transmission resources 522 and the reception resources 524. Separating the transmission frequency resources and the reception frequency resources with a guard band may help to reduce self-interference. Transmission resources and a reception resources that are immediately adjacent to each other may be considered as having a guard band width of 0. As an output signal from a wireless device may extend outside the transmission resources, the guard band may reduce interference experienced by the wireless device. Sub-band FDD may also be referred to as "flexible duplex".

If the full-duplex operation is for a UE or a device implementing UE functionality, the transmission resources 502, 512, and 522 may correspond to uplink resources, and the reception resources 504, 514, and 524 may correspond to downlink resources. Alternatively, if the full-duplex operation is for a base station or a device implementing base station functionality, the transmission resources 502, 512, and 522 may correspond to downlink resources, and the reception resources 504, 514, and 524 may correspond to uplink resources.

As described in connection with FIG. 1, a UE 104 and a base station 102 or 180 may use beamforming 182 to exchange downlink and uplink communication using directional beams. After determination of a beam for communication, conditions may change and may cause a beam to fail. For example, a UE may experience a beam failure if a user moves to a location that blocks the beam to the base station. For example, the UE may move to a different orientation, may move around a corner, or may move to a location in which a building or other structure blocks the beam. In other examples, the surrounding environment may change, e.g., a vehicle may move to a position that blocks the beam between the UE and the base station. If the current beam used by the UE becomes unreliable, the UE may switch to a new beam. The UE may monitor the quality of the beam and may perform radio link monitoring (RLM) in order to detect a reduction in the beam quality.

For example, a UE may monitor a quality of a signal received via reception beam(s). Measurements for RLM, e.g., of downlink signals, may be performed by a physical (PHY) layer of the UE based on one or more RLM reference signals. The PHY layer may pass the RLM measurements to a medium access control (MAC) layer and radio resource control (RRC) layer. The RRC layer may be responsible for detecting a radio link failure (RLF), and the MAC layer may be responsible for detecting beam failures.

The UE may use a Beam Failure Detection (BFD) procedure to identify problems in beam quality and may use a beam failure recovery (BFR) procedure when a beam failure is detected. For monitoring active link performances, a UE may perform measurements of at least one signal, e.g., reference signals, for beam failure detection. The measurements may include deriving a metric similar to a Signal to Interference plus Noise Ratio (SINR) for the signal, or RSRP strength or block error rate (BLER) of a reference control channel chosen by base station and/or implicitly derived by UE based on the existing RRC configuration. The reference signal may comprise any of CSI-RS, Physical Broadcast Channel (PBCH), a synchronization signal, or other reference signals for time and/or frequency tracking, etc. In some cases, the UE may determine a configured metric such as block error rate (BLER) for a reference signal. The measurement(s) may indicate the UE's ability to transmit an uplink transmission to the base station using the beam.

Thresholds may be defined in tracking the radio link conditions, the threshold(s) may correspond to an RSRP, a BLER, etc. that indicates an in-sync condition and/or an out-of-sync condition of the radio link. For example, a threshold, which may be referred to as Qout_LR, may be used by the PHY layer to trigger a failure indication to the MAC layer. For example, a beam failure instance may be determined if the monitored RLM reference signal(s) fall below the Qout_LR threshold, e.g., if the monitored RLM reference signals fall below Qout_LR. The MAC layer may use the indications of the beam failure instances in combination with a count threshold and/or timer to determine a beam failure. For example, the MAC layer may detect compare a number of beam failure instances to a beam failure instance maximum count threshold within a time based on a beam failure detection timer to determine that a beam failure has occurred.

An "out-of-sync" condition may indicate that the radio link condition is poor, and an "in-sync" condition may indicate that the radio link condition is acceptable, and the base station is likely to receive a transmission transmitted on the radio link. An Out-of-Sync condition may be declared when a block error rate for the radio link falls below a threshold over a specified time interval. An in-sync condition may be declared when a block error rate for the radio link is better than a threshold over a specified time interval. If the UE receives a threshold number of consecutive out-of-sync measurements over a period of time, the UE may declare a beam failure.

To configure the BFD procedure at the UE, the UE may receive an RRC configuration from the base station setting thresholds, parameters, and reference signals for the BFD procedures. For example, the UE may receive an RLM resource signal (RLM-RS) configuration including the count threshold and/or timer for determining a beam failure. The RLM-RS configuration may also identify UL and DL resources, e.g., a UL reference signal and/or a DL reference, that the UE is configured for performing measurements for the BFD procedure. For example, an RLM-RS configuration for full duplex BFD procedures may designate a channel measurement resources (CMRs), e.g., designating the DL reference signal, and/or an interference measurement resources (IMRs), e.g., designating a UL reference signal. The UE may be thusly configured to perform full duplex BFD measurements including measuring self-interference by performing BFD measurements on the IMRs and CMRs. The IMSs may indicate an SRS as the UL reference signal by including an SRS resource ID in the RLM-RS configuration.

When a beam failure is detected, a UE may take appropriate actions to recover the connection. For example, after multiple out-of-sync measurements, the UE may transmit a beam failure recovery signal, e.g., a beam failure recovery request (BFRQ) to initiate recovery of the connection with the base station. For example, the UE may receive an RRC configuration from the base station with parameters for a beam failure recovery procedure that the UE may use to indicate to the base station that the beam failure has been detected. The base station and the UE may communicate over active data/control beams both for DL communication and UL communication. The base station and/or UE may switch to a new beam direction using beam failure recovery procedures.

Figure 6:
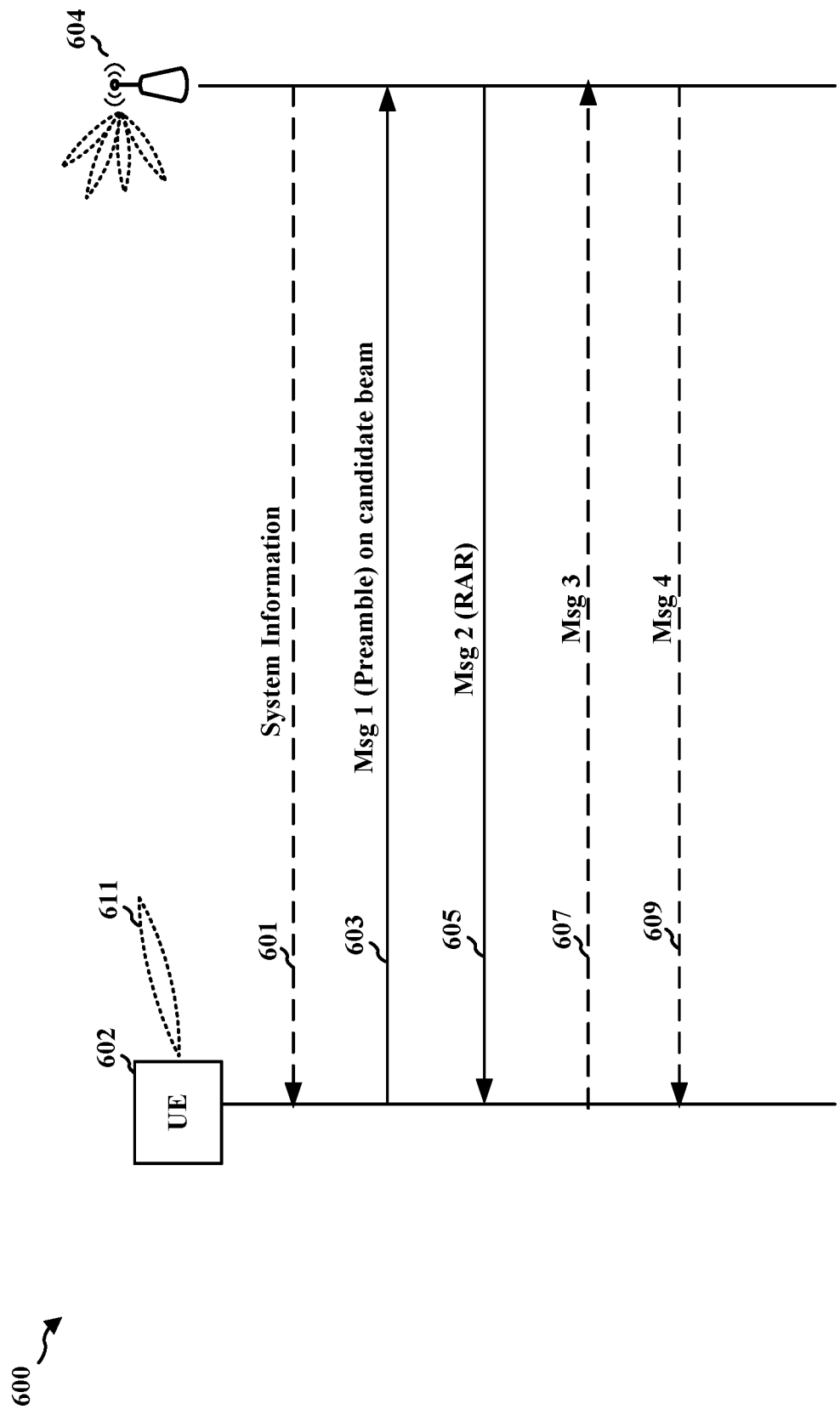
FIG. 6 illustrates an example random access channel (RACH) procedure for beam failure recovery.

The UE may attempt to perform beam failure recovery by initiating a random access procedure (e.g., a contention free random access (CFRA) procedure with a configured beam failure recovery information element (BFR IE)). FIG. 6 illustrates an example beam failure recovery random access channel (RACH) procedure 600 between a UE 602 and a base station 604. Before transmitting a random access preamble in Msg 1 603, the UE may identify a new target beam, e.g., beam 611, for communication with the base station based on RSRP measurements of one or more candidate beams. The UE may use the selected beam 611 to perform the RACH procedure for the beam failure recovery.

A UE may use Contention Based Random Access (CBRA), which may be performed when a UE is not synchronized with a base station, and the CFRA may be applied, e.g., as the UE 602 was previously synchronized to a base station 604.

Both the procedures include transmission of a random access preamble from the UE to the base station. In CBRA, a UE may randomly select a random access preamble sequence, e.g., from a set of preamble sequences. As the UE randomly selects the preamble sequence, the base station may receive another preamble from a different UE at the same time. Thus, CBRA provides for the base station to resolve such contention among multiple UEs. In CFRA, the network may allocate a preamble sequence to the UE rather than the UE randomly selecting a preamble sequence. This may help to avoid potential collisions with a preamble from another UE using the same sequence. Thus, CFRA is referred to as "contention free" random access.

The UE 602 may initiate the random access message exchange for beam failure recovery by sending, to the base station 604, a first random access message 603 (e.g., Msg 1) including a preamble and an indication that the first random access message 603 is for beam failure recovery using the selected candidate beam 611. Prior to sending the first random access message 603, the UE may obtain random access parameters, e.g., including preamble format parameters, time and frequency resources, parameters for determining root sequences and/or cyclic shifts for a random access preamble, etc., e.g., in system information 601 from the base station 604, in some examples. A RACH procedure based on system information 601 may be referred to as a system information RACH procedure. The preamble may be transmitted with an identifier, such as a Random Access RNTI (RA-RNTI). The UE may monitor for a response from the base station during a random access response window.

The base station responds to the first random access message 603 by sending a second random access message 605 (e.g. Msg 2) using PDCCH and including a random access response (RAR). The RAR may include, e.g., an identifier of the random access preamble sent by the UE, a time advance (TA), an uplink grant for the UE to transmit data, cell radio network temporary identifier (C-RNTI) or another identifier, and/or a back-off indicator. The RACH procedure for beam failure recovery enables the UE and base station to establish communication using a new beam to replace the beam with the detected beam failure.

In some examples, upon receiving the RAR (e.g., 605), the UE 602 may transmit a third random access message 607 (e.g., Msg 3) to the base station 604, e.g., using PUSCH, that may include a RRC connection request, an RRC connection re establishment request, or an RRC connection resume request, depending on the trigger for the initiating the random access procedure. The base station 604 may then complete the random access procedure by sending a fourth random access message 609 (e.g., Msg 4) to the UE 602, e.g., using PDCCH for scheduling and PDSCH for the message. The fourth random access message 609 may include a random access response message that includes timing advancement information, contention resolution information, and/or RRC connection setup information. The UE 602 may monitor for PDCCH, e.g., with the C-RNTI. If the PDCCH is successfully decoded, the UE 602 may also decode PDSCH. The UE 602 may send HARQ feedback for any data carried in the fourth random access message.

If two UEs transmit a same preamble at 603, e.g., in CBRA, both UEs may receive the RAR leading both UEs to send a third random access message 607. The base station 604 may resolve such a collision by being able to decode the third random access message from only one of the UEs and responding with a fourth random access message to that UE. The other UE, which did not receive the fourth random access message 609, may determine that random access did not succeed and may re-attempt random access. Thus, the fourth message may be referred to as a contention resolution message. The fourth random access message 609 may complete the random access procedure. Thus, the UE 602 may then transmit uplink communication and/or receive downlink communication with the base station 604 based on the RAR (e.g., 605).

Figure 7:
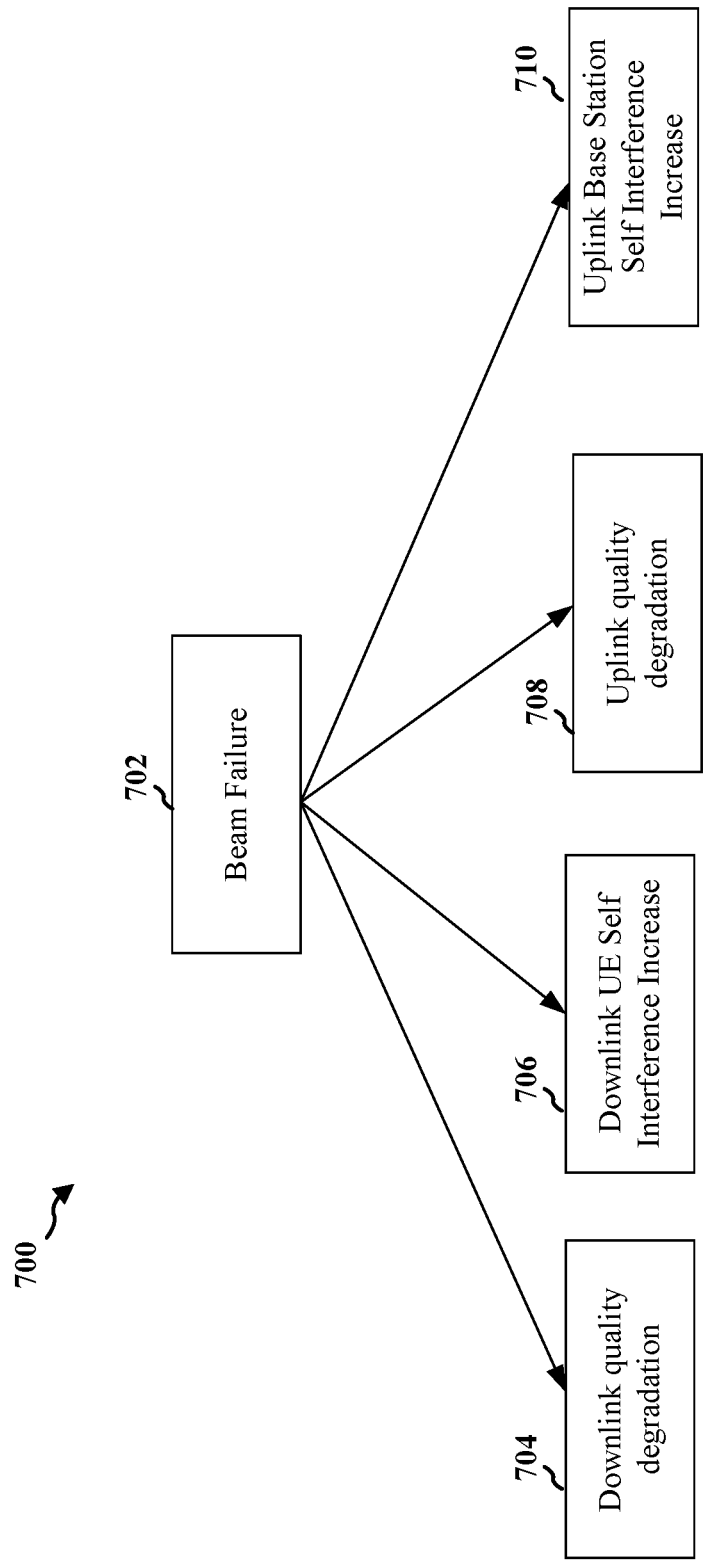
FIG. 7 illustrates examples of categories leading to beam failure.

Beam failure may occur for any of various reasons. FIG. 7 illustrates a diagram 700 of example reasons that may cause a beam failure 702. In some aspects, the beam failure may be based on downlink quality degradation 704 and/or uplink quality degradation 708. As an example, the downlink and/or uplink beam may quality may degrade based on a blocked beam between the UE and the base station. In some aspects, the beam failure 702 may be caused by an increase in self-interference at a UE, as shown at 706. For example, a UE may receive at least a portion of the UE's own uplink transmission, such as the UE 404b in FIG. 4B, that causes an increased amount of self-interference in downlink reception at the UE. In some aspects, the increase in self-interference may be due to a dynamic clutter or a reflecting object in a changing environment of the UE that reflects the uplink transmission back to the UE. In some aspects, the beam failure 702 may be caused by an increase in self-interference at a base station, as shown at 710. For example, a base station, such as the base station 402a in FIG. 4A, may receive at least a portion of the base station's own downlink transmission leading to an increased amount of self-interference in uplink reception at the base station. In some aspects, the increased self-interference at the base station may be due to increased reflection of a downlink signal to the UE 404a that interferes with uplink reception at the base station of the uplink signal from the UE 406a.

Aspects presented herein provide for improved measurements relating to BFD due to self-interference during full duplex operation. In some aspects, the UE may not be configured with a reference signal for full duplex BFD. For example, the RRC configuration (e.g., the RLM-RS configuration) may not be configured with a DL reference signal/resources and/or UL reference signal/resources for a full duplex BFD (e.g., the CMRs and/or IMRs may not be configured). For example, the base station may not have yet configured the UE for full duplex BFD. As another example, the UE may have failed to receive the RRC configuration for full duplex BFD. As another example, the base station may not configure specific BFD-RS, and the UE may reuse other purposed RSs to do BFD procedures. In such situations, the UE may be unable to perform BFD procedures for full duplex operation and may experience beam failure and loss of connections to a base station.

Aspects presented herein provide improved detection and signaling relating to beam failure detection through derivation of resource locations for full duplex BFD from a full duplex CORESET. For example, resource locations may be determined from one or more QCL relationships to one or more TCI states in a full duplex CORESET. For example, aspects presented herein provide a full duplex BFD framework for DL and/or UL beam designation for full duplex BFD when full duplex BFD resources are not configured. The full duplex BFD framework may be used to derive DL and/or UL beam from a full duplex CORESET for a full duplex BFD procedure using QCL relationships to one or more TCI states indicated in the full duplex CORESET. Each TCI state may correspond to a QCL relationship. Accordingly, a UE may utilize the full duplex BFD framework to perform full duplex BFD procedure and detect beam failures even when the RLM-RS is not configured for full duplex BFD.

Figure 8:
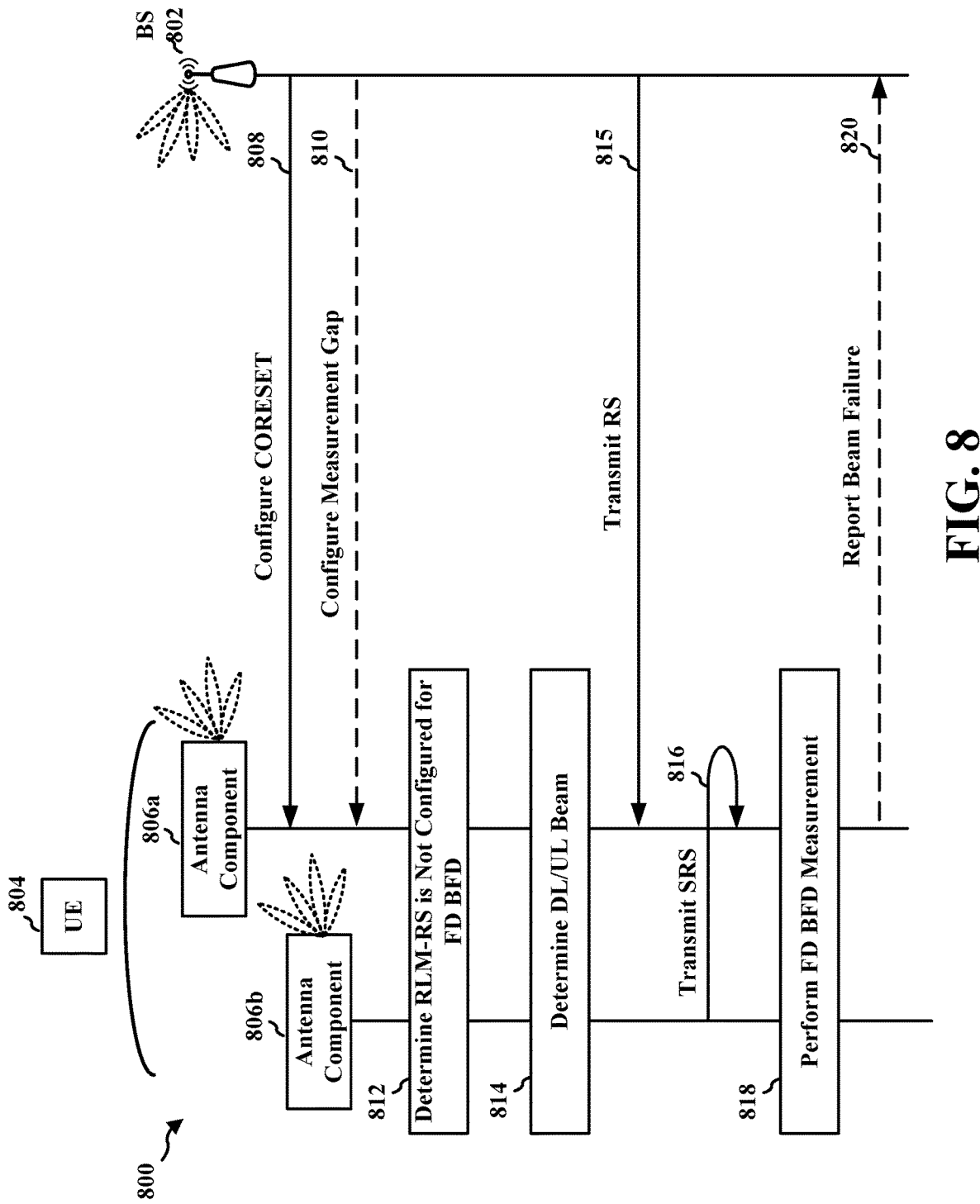
FIG. 8 is an example communication flow between a base station and a UE including derivation of resource locations for full duplex BFD.

FIG. 8 illustrates an example communication flow diagram 800 between a UE 804 and a base station 802 including derivation of resource locations for full duplex BFD. The UE 804 may be may be implemented as, for example, UE 104 of FIG. 1 and the base station 802 may be implemented as, for example, base station 102/180 of FIG. 1. The UE 804 may include antenna components 806a and 806b, which may be antenna elements, antenna panels, and/or antenna arrays to facilitate the beamforming and operating as the physical interface with the base station 802. The UE 804 may include any number of antenna components, with two such components provided for illustrative purposes only. In the example shown in FIG. 8, the antenna component 806a may be configured as a local receiver while the antenna component 806b may be configured as a local transmitter for full duplex operation.

The base station 802 may, at 808, configure a full duplex CORESET with resources for the UE 804 to monitor in order to receive PDCCH for full duplex operation. For example, the base station 802 may configure a full duplex CORESET indicating one or more TCI states in RRC signaling for the UE 804. The base station 802 may activate the one or more TCI states for the UE, at 808. For example, the base station may transmit a MAC-CE or other DL signal indicating the CORESET including one or more of the configured TCI states that are activated for the UE to antenna component 806a of UE 804.

Each TCI state may include QCL information that the UE 804 can use to derive timing/frequency error and/or transmission/reception spatial filtering for transmitting/receiving a signal. A TCI state may be indicated in downlink signaling from the base station, such as in downlink control information (DCI). The TCI state indicates QCL relationship between one signal and the signal to be transmitted/received. For example, a TCI state may indicate a QCL relationship between downlink reference signals (RSs) in one RS set and a PDSCH/PDCCH DM-RS antenna ports. TCI states can provide information about different beams. Thus, a TCI state may indicate a beam to be used for a particular channel (e.g., PDSCH, PDCCH, PUSCH, PUCCH, etc.) based on a beam configured for a reference signal. The reference signal may be referred to as the source reference signal for the TCI state. A full duplex CORESET may provide information for locating a DL reference signal (e.g., a CSI-RS and/or an SSB) and/or an UL reference signal (e.g., a SRS). In some aspects, a full duplex CORESET may indicate the UL reference signal using an UL TCI state that indicates an SRS resource identified (ID) beam. In another aspects, a DL reference signal may indicate an UL TCI state and the UE may determine the UL reference signal corresponding to the DL reference signal. For example, a CSI-RS and/or SSB indicated by a DL TCI state may correspond to a SRS resource ID beam and the UE may determine the SRS resource ID beam from the CSI-RS and/or SSB on the DL.

For full duplex, the TCI state indicated in the full duplex CORESET may provide information indicate DL beams to be used for downlink RSs, as well as paired UL beams for uplink RSs for simultaneous reception and transmission. Each TCI state indicated in the full duplex CORESET may provide information for locating a DL beam and paired UL beam, such as a CSI-RS beam and/or an SSB beam for the DL and an SRS beam for the UL.

For Single Frequency Networks (e.g., network simultaneously transmitting the same transmission to a UE from multiple base stations), a full duplex CORESET may allow two or more TCI states per DM-RS port and each TCI state corresponds to a QCL relation. Through this configuration, a UE may support single layer transmission with two or more beams and/or single layer receipt with two or more beams based on the number of TCI states per uplink or downlink. For example, one full duplex CORESET may corresponds to two TCI states for simultaneous transmissions of the same control or data to the UE via one port. Thus, the two or more TCI states may provide for two or more pairs of DL and UL beams. Accordingly, while in some aspects, the full duplex CORESET may indicate one TCI state, in other aspects, the full duplex CORESET may indicate two TCI states or more.

The UE 804 may determine, at 812, that the RLM-RS is not configured for full duplex BFD. For example, the RLM-RS may not be configured with CMRs and/or IMRs for locating DL and/or UL beams to be used for performing full duplex BFD measurements.

The UE 804 is configured to determine, at 814, at least one DL beam for the full duplex BFD based on a full duplex CORESET. For example, the UE 804 may determine at least one DL beam from the one or more QCL relationships to the one or more TCI states indicated in the full duplex CORESET configured at 808. For example, the UE 804 may locate a DL beam having a QCL Type D relationship to a TCI state of the full duplex CORESET. The QCL Type D relationship indicates that a located beam corresponds to spatial reception (Rx) parameters of the TCI state for use in locating a DL beam for beam forming with the base station 802. The TCI state may indicate which reference signal to use on the downlink, for example, the TCI state may indicate to use a CSI-RS and/or an SSB. In one example, the UE 804 may locate a CSI-RS beam having a QCL Type D relationship to the TCI state, for example, where the TCI state indicates the CSI-RS is to be used on the downlink. In another example, the UE 804 may use an SSB beam having a QCL Type D relationship to the TCI state. Furthermore, where multiple TCIs stated are indicated in the full duplex CORESET, the UE 804 may locate multiple DL beams each having a QCL Type D relationship to each of the TCI states.

Having located one or more DL beams, at 818, the UE 804 may perform full duplex BFD at resources location(s) corresponding to the determined DL beam(s). For example, the UE 804 may perform full duplex BFD measurements on resources at one or more CSI-RS resources locations corresponding to one or more CSI-RS beams having QCL Type D relationships to the one more TCI states. As another example, the UE 804 may perform full duplex BFD measurements at one or more SSB resources locations corresponding to one or more SSB beams having QCL Type D relationships to the one or more TCI states. For example, the UE 804 may, at 815, receive one or more reference signals (e.g., CSI-RS or SSB) transmitted by the base station on the determined at least one DL beam using the antenna component 806b. The UE 804 may be configured to perform the full duplex BFD measurements on the received one or more reference signals. At 818, the measurements may include deriving a metric similar to a SINR at the resource location(s), or RSRP strength or block error rate (BLER) the resource location(s).

The UE 804 may also, at 814, determine at least one UL beam for the full duplex BFD based on a full duplex CORESET that each of the at least one UL beam is paired with each of the at least one DL beam associated with the full duplex CORESET. For example, the UE 804 may determine at least on UL beam based on the one or more QCL relationships to the one or more TCI states. For example, as described above, each TCI state associated with the full duplex CORESET indicates a DL beam and its paired UL beam. Accordingly, the UE 804 may determine an UL beam paired with a determined DL beam having a QCL Type D relationship to a TCI state indicated in the full duplex CORESET. For example, at 814, the UE 804 may locate an SRS beam as the UL beam that is paired with the CSI-RS beam (or SSB beam) having a QCL Type D relationship to the TCI state. Where multiple TCI states are indicated, multiple DL beams can be located and the paired UL beams derived therefrom.

The UE 804 may use resources (e.g., reference signals or resources based on reference signals) indicated by a DL TCI state to locate a paired UL beam. For example, if the TCI state is indicated by CSI-RS and/or SSB but not an SRS resource ID, the UE 804 may find an SRS resource ID beam that is paired with the CSI-RS and/or SSB having the QCL Type D relationship to the TCI state. For example, a CSI-RS and/or SSB indicated by a DL TCI state may correspond to an SRS resource ID beam and the UE may determine the SRS resource ID beam from the CSI-RS and/or SSB on the DL.

Alternatively, if the TCI state is indicated by an SRS resource ID, the UE 804 may use the indicated SRS resource ID to locate UL beam. For example, a full duplex CORESET may indicate the UL reference signal using an UL TCI state that indicates the SRS resource identified (ID) beam.

Having located one or more UL beams, at 818, the UE 804 may perform full duplex BFD at resources location(s) corresponding to the determined UL beam(s). For example, the UE 804 may perform full duplex BFD measurements at one or more SRS resources locations as determined at 814. For example, the UE 804 can perform self-interference BFD measurements on reception of the SRS on the DL beam, where the SRS was transmitted on the determined UL beam. For example, the UE 804 may, at 816, transmit the SRS on the determined at least one UL beam using the antenna component 806b as the local transmitter. The antenna component 806a may receive one or more SRS due to self-interference at the determined at least one DL beam as described in connection to FIGS. 4A-C, 5, and 7. The UE 804 may be configured to perform the full duplex BFD measurements on the received one or more SRS. At 818, the measurements may include deriving a metric similar to a SINR at the resource location(s), or RSRP strength or block error rate (BLER) the resource location(s) from resources location(s) corresponding to the determined UL beam(s) and/or DL beam(s). For example, SINR may be determined by dividing a signal strength as measured via reference signals at the DL beam at 815 (e.g., the CSI-RS or SSB) divided by self-interference measured via reference signals transmitted on the UL by the UE and measured at the DL beam 816.

By using one or more DL beams (e.g., one or more CSI-RS and/or SSB) and paired UL beam (e.g., one or more SRS beam), the UE 804 may calculate layer 1 (L1) SINR for full duplex BFD. For example, L SINR measurements may include a channel measurement (e.g., similar to the CMRs in the RLM-RS configuration) based on a CSI-RS and/or a self-interference measurement (e.g., similar to the IMRs in the RLM-RS configuration) based on the SRS).

In various aspects, the UE 804 may perform self-interference BFD measurements to measure interference due to uplink transmissions on an uplink beam associated with the SRS ID beam in the configured resources, e.g., the latest SRS resource location. As another example, the base station 802, at 810, may configure a measurement gap and/or duration in the communication flow, for UE 804 to perform self-interference full duplex BFD measurements. The measurement gap may include a period of time during which the base station does not transmit downlink communication to the UE (e.g., downlink data) and does not schedule the UE for uplink transmissions in order to provide a time period during which the UE may perform the full duplex BFD measurements. The UE 804 may then perform the full duplex BFD measurements during the configured measurement gap. While the measurement gap is shown as configured at 810, it will be appreciated that the gap may be configured at any point during the communication flow diagram 800.

Where a beam failure is detected based on the measurements at 818, the UE 804 may report a beam failure to the base station 802 at 820. At 820, the UE 804 may also initiate a BFR procedure to recover a connection to the base station 802.

Figure 9A:
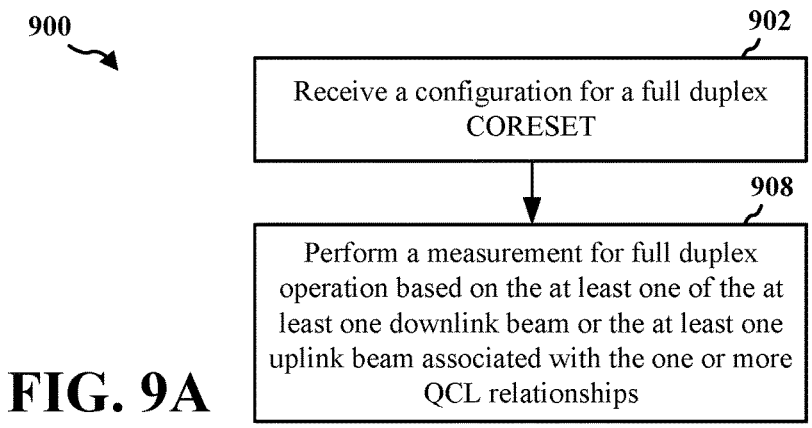
FIGS. 9A and 9B are flowcharts methods of wireless communication.

FIG. 9A is a flowchart of a method 900 of wireless communication. The method may be performed by a UE (e.g., the UE 104; the UE 404a-c; the UE 602; the UE 804; the apparatus 1002). In some aspects, the method may be performed by the apparatus 1002 in FIG. 10, which includes memory and at least one processor, the apparatus including one or more components configured to perform the aspects of the method 900. The method may enable full duplex BFD procedures by providing for derivation of resource locations for full duplex BFD procedures based on a full duplex CORESET, for example, from one or more QCL relationships to one or more TCI states indicated in a full duplex CORESET.

At 902, the UE receives a configuration for a full duplex CORESET. FIG. 8 illustrates an example of a UE receiving a full duplex CORESET configuration from a base station. The reception may be performed, e.g., by the reception component 1030 of the apparatus 1002 in FIG. 10. A full duplex CORESET may include resources for the UE to monitor in order to receive PDCCH for full duplex operation. For example, the base station may configure a full duplex CORESET indicating one or more TCI states in RRC signaling and may activate one or more TCI states for the UE, e.g., in a MAC-CE or other signaling.

At 908, the UE performs a measurement for full duplex operation based on at least one of a DL beam and/or the UL beam based on one or more QCL relationship to one or more TCI states of a full duplex CORESET and in response to an absence of a configuration of a reference signal for full duplex BFD. For example, the UE may perform measurements for full duplex BFD using resources located at the determined one or more DL beams, as described above in connection to 818 of FIG. 8. The UE may also perform measurements for self-interference of full duplex BFD using resources transmitted on the UL beam (e.g., at 906) and received by the UE on the determined one or more DL beams, as described above in connection to 818 of FIG. 8. 908 may be performed, for example, by measurement component 1048 of apparatus 1002.

Figure 9B:
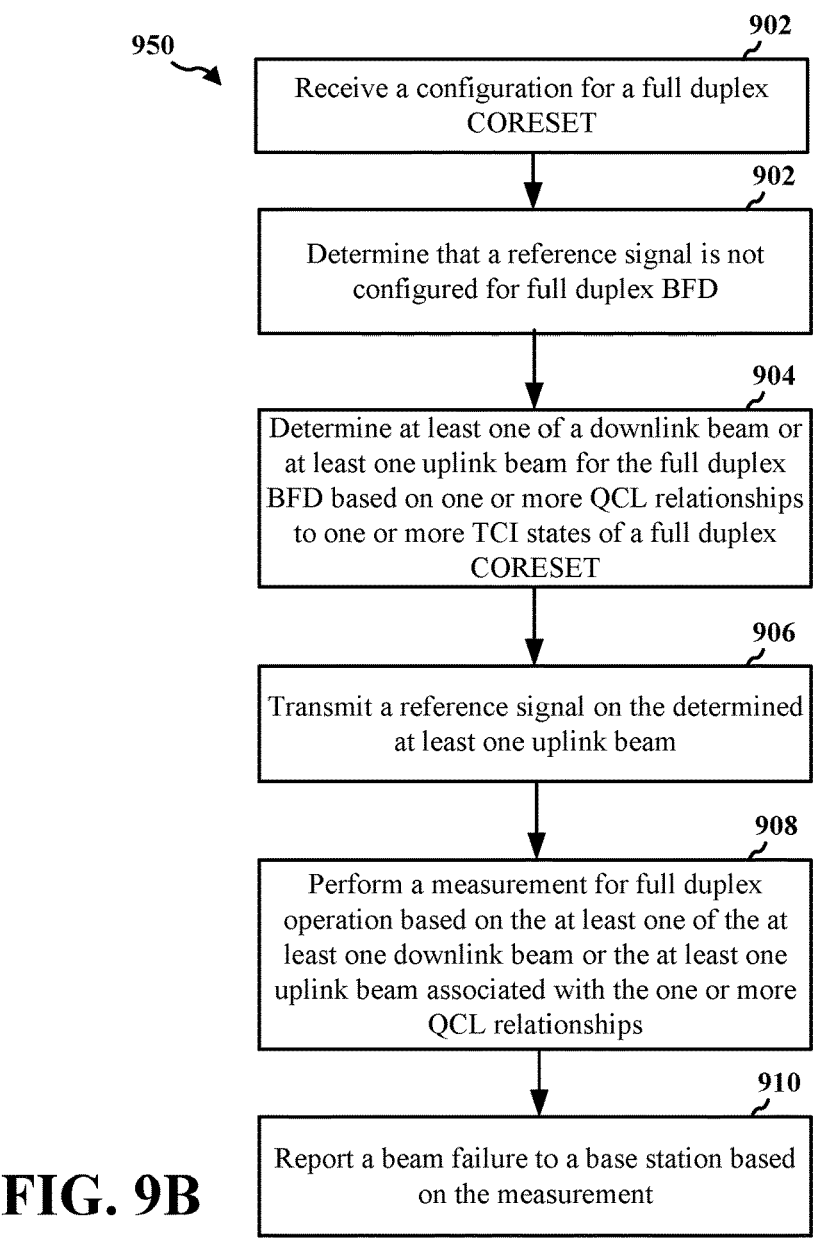

FIG. 9B is a flowchart of a method 950 of wireless communication. The method may be performed at a UE and may include the reception of the configuration for the full duplex CORESET at 902 and the measurement for full duplex operation based on at least one of a DL beam and/or an UL beam based on one or more QCL relationship to one or more TCI states of a full duplex CORESET, at 908, such as described in connection with FIG. 9A.

Figure 10:
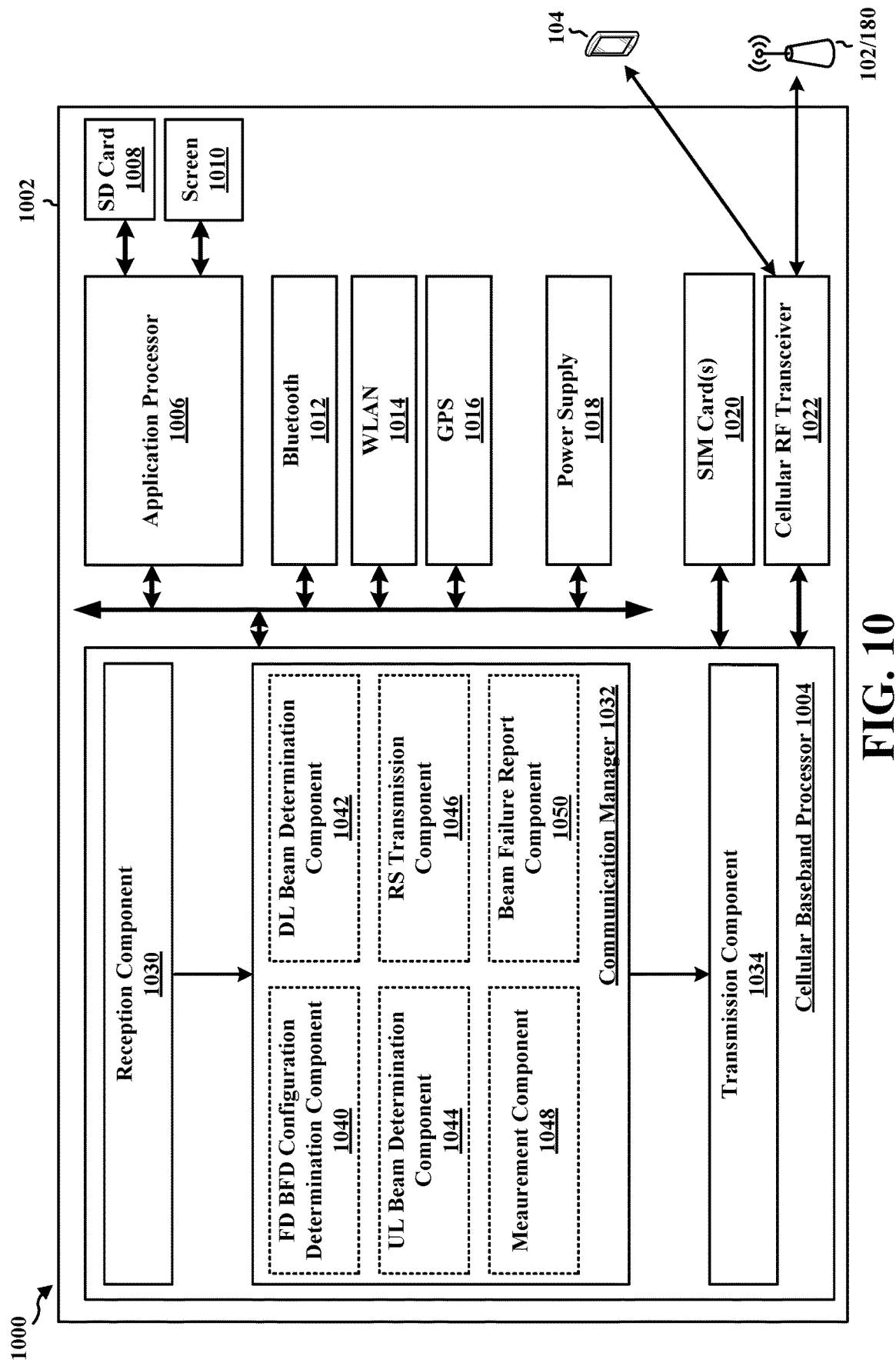
FIG. 10 is a diagram illustrating an example of a hardware implementation for an example apparatus.

In some aspects, the UE may determine that a reference signal is not configured for full duplex BFD, e.g., at 903. For example, the UE may determine that the UL resources (e.g., CMRs) and/or DL resources (e.g., IMRs) are not configured in the RLM-RS configurations. For example, 903 may be performed by full duplex BFD determination component 1040 of apparatus 1002. FIG. 10 illustrates an example of an apparatus that may be implemented as UE 104 and/or UE 804. For example, 903 may be performed as described in connection with 812 of FIG. 8.

At 904, the UE may determine at least one DL beam and/or at least one UL beam for the full duplex BFD based on one or more QCL relationship to one or more TCI states of a full duplex CORESET. The UE may determine the at least one DL beam based on the one or more QCL relationship to one or more TCI states, for example, a QCL Type D relationship to the TCI state. For example, 904 may be performed by DL determination component 1042 of apparatus 1002. The UE may also determine the at least one UL beam based on the QCL relationships to one or more TCI states, for example, a QCL Type D relationship to the TCI state. For example, 904 may be performed by UL beam determination component 1044 of apparatus 1002. The UE may perform 902 in a manner similar to 814 of FIG. 8.

At 906, the UE may transmit a reference signal on the determined at least one uplink beam. For example, 906 may be performed by the reference signal (RS) transmission component 1046 of apparatus 1002. The UE may perform 902 in a manner similar to 816 of FIG. 8.

At 910, the UE may report a beam failure to a base station based on the measurement. For example, if measurements performed at 906 indicate beam failure, the UE may report the occurrence of the beam failure at 908. The UE may also initiate a BFR procedure to reestablish connection with the base station. For example, 910 may be performed by beam failure report component 1050 of apparatus 1002.

FIG. 10 is a diagram 1000 illustrating an example of a hardware implementation for an apparatus 1002. The apparatus 1002 may be a UE, a component of a UE, or more implement UE functionality. In some aspects, the apparatus 1002 may include a cellular baseband processor 1004 (also referred to as a modem) coupled to a cellular RF transceiver 1022. In some aspects, the apparatus 1002 may further include one or more subscriber identity modules (SIM) cards 1020, an application processor 1006 coupled to a secure digital (SD) card 1008 and a screen 1010, a Bluetooth module 1012, a wireless local area network (WLAN) module 1014, a Global Positioning System (GPS) module 1016, and/or a power supply 1018. The cellular baseband processor 1004 communicates through the cellular RF transceiver 1022 with the UE 104 and/or BS 102/180. The cellular baseband processor 1004 may include a computer-readable medium/memory. The computer-readable medium/memory may be non-transitory. The cellular baseband processor 1004 is responsible for general processing, including the execution of software stored on the computer-readable medium/memory. The software, when executed by the cellular baseband processor 1004, causes the cellular baseband processor 1004 to perform the various functions described supra. The computer-readable medium/memory may also be used for storing data that is manipulated by the cellular baseband processor 1004 when executing software. The cellular baseband processor 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the cellular baseband processor 1004. The cellular baseband processor 1004 may be a component of the UE 350 and may include the memory 360 and/or at least one of the TX processor 368, the RX processor 356, and the controller/processor 359. In one configuration, the apparatus 1002 may be a modem chip and include just the cellular baseband processor 1004, and in another configuration, the apparatus 1002 may be the entire UE (e.g., see 350 of FIG. 3) and include the additional modules of the apparatus 1002.

The communication manager 1032 includes a full duplex BFD determination component 1040 that is configured to receive a CORESET configuration for a full duplex CORESET and/or to determine that resources are not configured for full duplex BFD, e.g., as described in connection with 902 or 903 of FIGS. 9A and 9B. The communication manager 1032 further includes a DL determination component 1042 that receives input in the form of one or more TCI states indicated in the full duplex CORESET configured by a base station and is configured to determine at least one DL beam from one or more QCL relationships to the one or more TCI states, e.g., as described in connection with 904 of FIG. 9B. The communication manager 1032 further includes an UL beam determination component 1044 that receives input in the form of the one or more TCI states indicated in the full duplex CORESET and is configured to determine at least one UL beam from the one or more QCL relationships to the one or more TCI states, e.g., as described in connection with 904 of FIG. 9B. The communication manager 1032 may further include an RS transmission component 1046 that is configured to transmit a reference signal at locations of the one or more UL beams, e.g., as described in connection with 906 of FIG. 9B. The communication manager 1032 further includes a measurement component 1048 that receives input in the form of resources (e.g., reference signals) located at the one or more DL beams and transmitted by at least one of the base station on the DL beam and/or the UE at on the one or more UL beams (e.g., self-interference) and is configured to perform full duplex BFD measurements based on the resources, e.g., as described in connection with 908 of FIGS. 9A and 9B. The communication manager 1032 further includes a beam failure report component 1050 that receives input in the form of an indication of a beam failure from the measurement component 1048 and is configured to report a beam failure to the base station, e.g., as described in connection with 910 of FIG. 9B.

The apparatus may include additional components that perform each of the blocks of the algorithm in the flowcharts of FIGS. 9A and 9B, and/or any of the aspects performed by the UE in FIG. 6 or FIG. 8. As such, each block in the flowcharts of FIGS. 9A and 9B, and/or any of the aspects performed by the UE in FIG. 6 or FIG. 8, may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1002 may include a variety of components configured for various functions. In one configuration, the apparatus 1002, and in particular the cellular baseband processor 1004, includes means for receiving a CORESET configuration for a full duplex CORESET and means for performing a measurement for full duplex operation based on at least one of a downlink beam or an uplink beam for full duplex beam failure detection based on one or more QCL relationships to one or more TCI states of the CORESET based on an absence of a configuration of a reference signal for the full duplex beam failure detection. The apparatus 1002 may further include means for determining that a reference signal is not configured for full duplex BFD. The apparatus 1002 may further include means for determining at least one of a downlink beam or at least one uplink beam for the full duplex BFD based on one or more QCL relationships to one or more TCI state of a full duplex CORESET. The apparatus 1002 may further include means for performing a measurement for full duplex operation based on the at least one of the at least one downlink beam or the at least one uplink beam associated with the one or more QCL relationships. The apparatus 1002 may further include means for transmitting a sounding reference signal on the determined at least one uplink beam. The apparatus 1002 may further include means for reporting a beam failure to a base station based on the measurement. The means may be one or more of the components of the apparatus 1002 configured to perform the functions recited by the means. As described supra, the apparatus 1002 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 11:
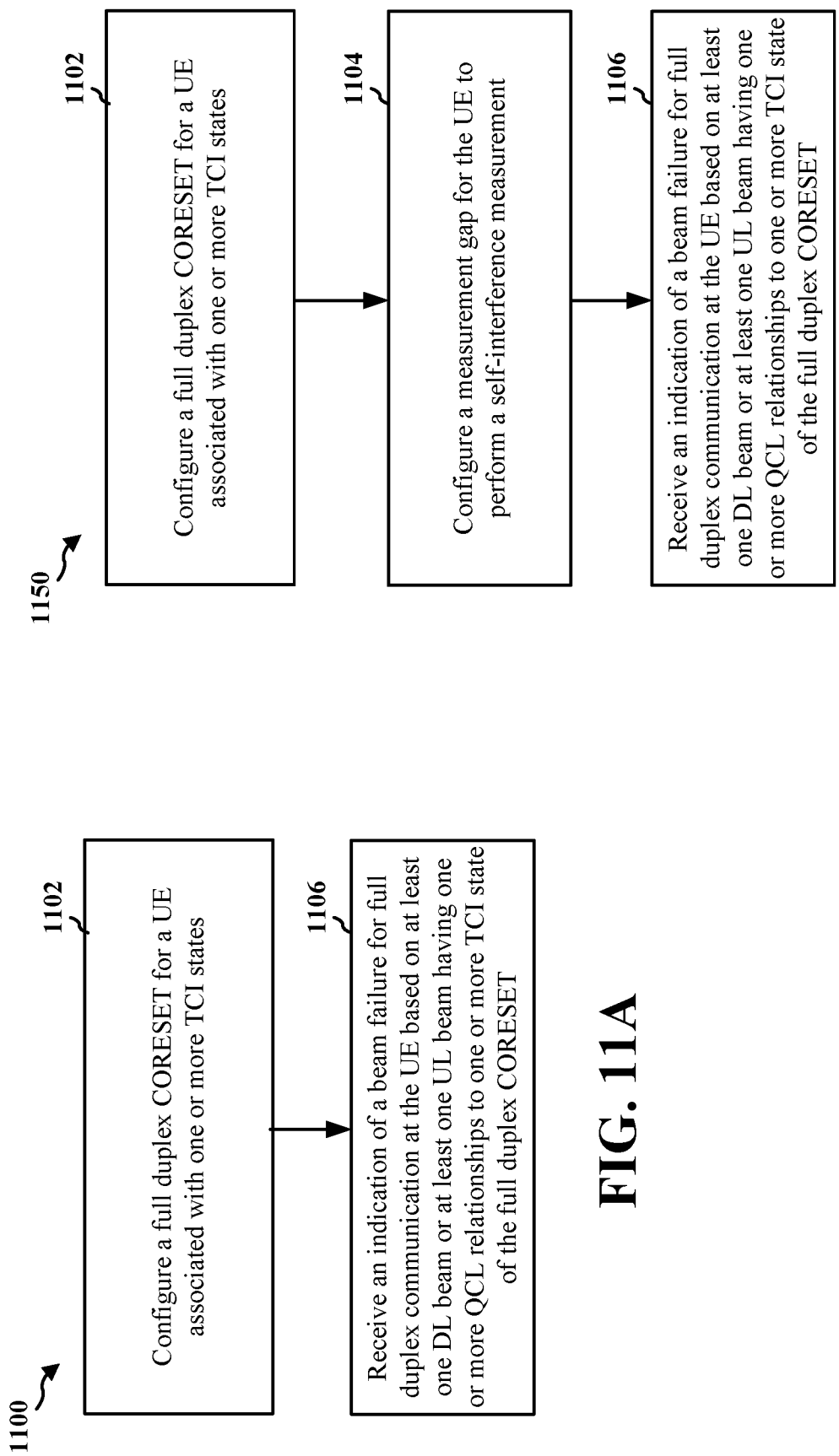
FIGS. 11A and 11B are flowcharts of methods of wireless communication.

FIG. 11A is a flowchart 1100 of a method of wireless communication. The method may be performed by a base station (e.g., the base station 102/180; the base station 802; the apparatus 1202. In some aspects, the method may be performed by the apparatus 1202 in FIG. 12, which includes memory and at least one processor, the apparatus including one or more components configured to perform the aspects of the method 1100. The method provides for configuring a full duplex CORESET from which the UE may derive resources for full duplex BFD procedures, for example, from QCL relationships to TCI states indicated in the full duplex CORESET.

Figure 12:
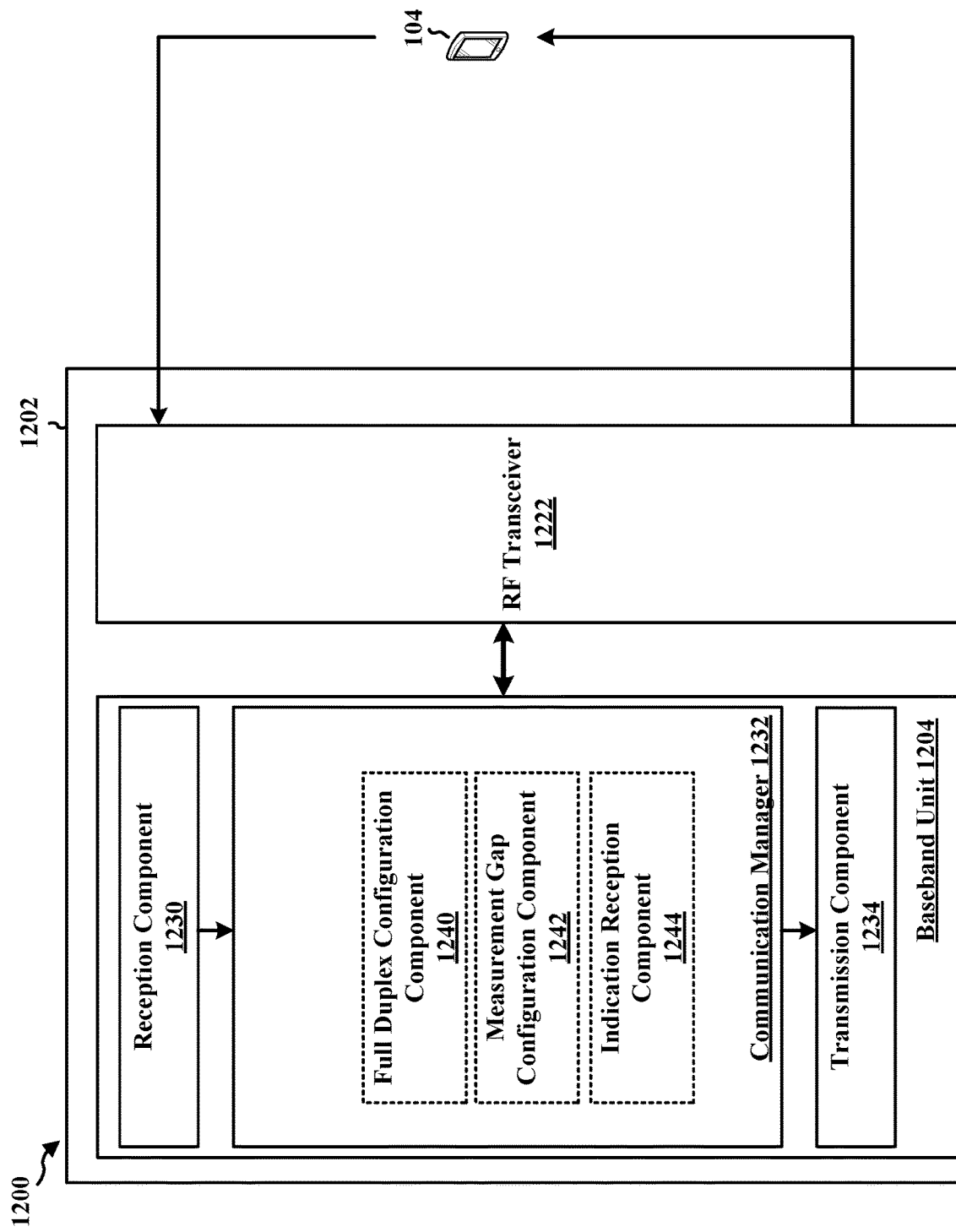
FIG. 12 is a diagram illustrating an example of a hardware implementation for an example apparatus.

At 1102, the base station configures a full duplex CORESET for a UE associated with one or more TCI states. For example, 1102 may be performed by full duplex configuration component 1240 of apparatus 1202 of FIG. 12. FIG. 12 illustrates an example of an apparatus that may be implemented as base station 102/180 and/or base station 802. For example, 1102 may be performed as described in connection with 808 of FIG. 8.

At 1106, the base station receives an indication of a beam failure for full duplex communication at the UE based on at least one DL beam or at least one UL beam having one or more QCL relationships to one or more TCI state of the full duplex CORESET. For example, when the UE determines a beam failure to occur, based on full duplex BFD measurements on resources located at the at least one DL beam or at least one UL beam having one or more QCL relationship to one or more TCI state of the full duplex CORESET, the base station may receive an indication of such an event from the UE. Furthermore, the base station may receive the indication, for example, as described in connection with 820 of FIG. 8. For example, 1106 may be performed by the indication reception component 1244 of the apparatus 1202.

FIG. 11B is a flowchart of a method 1150 of wireless communication. The method may be performed at a base station and may include the configuration for the full duplex CORESET at 1102 and the reception of an indication of a beam failure for full duplex communication at the UE based on at least one DL beam or at least one UL beam having one or more QCL relationships to one or more TCI state of the full duplex CORESET, at 1106, such as described in connection with FIG. 11A.

For example, at 1104, the base station may configure a measurement gap for the UE to perform a self-interference measurement. For example, 1104 may be performed by measurement gap configuration component 1242 of the apparatus 1202. The base station may configure the measurement gap, for example, as described in connection with 810 of FIG. 8.

FIG. 12 is a diagram 1200 illustrating an example of a hardware implementation for an apparatus 1202. The apparatus 1202 may be a base station, a component of a base station, or may implement base station functionality. In some aspects, the apparatus 1202 may include a baseband unit 1204. The baseband unit 1204 may communicate through a cellular RF transceiver 1222 with the UE 104. The baseband unit 1204 may include a computer-readable medium/memory. The baseband unit 1204 is responsible for general processing, including the execution of software stored on the computer-readable medium/memory. The software, when executed by the baseband unit 1204, causes the baseband unit 1204 to perform the various functions described supra. The computer-readable medium/memory may also be used for storing data that is manipulated by the baseband unit 1204 when executing software. The baseband unit 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the baseband unit 1204. The baseband unit 1204 may be a component of the base station 310 and may include the memory 376 and/or at least one of the TX processor 316, the RX processor 370, and the controller/processor 375.

The communication manager 1232 includes a full duplex configuration component 1240 that is configured to configure a full duplex CORESET for a UE associated with one or more TCI states, e.g., as described in connection with 1102 of FIGS. 11A and/or 11B. The communication manager 1232 may further include a measurement gap configuration component 1242 that is configured to configure a measurement gap for the UE to perform a self-interference measurement, e.g., as described in connection with 1104 of FIG. 11B. The communication manager 1232 further includes an indication reception component 1244 that is configured to receive an indication of a beam failure for full duplex communication at the UE based on at least one DL beam or at least one UL beam having one or more QCL relationships to one or more TCI state of the full duplex CORESET, e.g., as described in connection with 1106 of FIGS. 11A and/or 11B.

The apparatus may include additional components that perform each of the blocks of the algorithm in the flowcharts of FIGS. 11A, 11B, and the aspects performed by the base station in FIGS. 6 and/or 8. As such, each block in the flowcharts of FIGS. 11A, 11B, and the aspects performed by the base station in FIGS. 6 and/or 8, may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1202 may include a variety of components configured for various functions. In one configuration, the apparatus 1202, and in particular the baseband unit 1204, includes means for configuring a full duplex CORESET for a UE associated with one or more TCI states and means for receiving an indication of a beam failure for full duplex communication at the UE based on at least one DL beam or at least one UL beam having one or more QCL relationships to one or more TCI states of the full duplex CORESET. The means may be one or more of the components of the apparatus 1202 configured to perform the functions recited by the means. As described supra, the apparatus 1202 may include the TX Processor 316, the RX Processor 370, and the controller/processor 375. As such, in one configuration, the means may be the TX Processor 316, the RX Processor 370, and the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication at a UE, comprising: receiving a CORESET configuration for a full duplex CORESET; and performing a measurement for full duplex operation based on at least one of a downlink beam or an uplink beam for full duplex beam failure detection based on one or more QCL relationships to one or more TCI states of the CORESET based on an absence of a configuration of a reference signal for the full duplex beam failure detection.

In aspect 2, the method of aspect 1 further includes that the UE determines at least one downlink reference signal for the full duplex beam failure detection based on the at least one downlink beam having a QCL type D relationship to the one or more TCI states of the full duplex CORESET.

In aspect 3, the method of aspect 2 further includes that the at least one downlink reference signal for the full duplex beam failure detection comprises one or more of a CSI-RS or a SSB.

In aspect 4, the method of aspect 3 further includes that the UE performs the measurement for the full duplex operation at CSI-RS resource locations for one or more CSI-RS beams corresponding to the one or more TCI states.

In aspect 5, the method of aspect 3 or 4 further includes that the UE performs the measurement for the full duplex operation at SSB resource locations for one or more SSB beams corresponding to the one or more TCI states.

In aspect 6, the method of any of aspects 1-5 further includes that UE determines the uplink beam paired with the downlink beam for the at least one downlink reference signal having the QCL type D relationship to the one or more TCI states of the full duplex CORESET.

In aspect 7, the method of aspect 6 further includes that the UE determines an uplink beam based on an uplink TCI state indicated by a downlink reference signal, and the UE determines an SRS resource ID beam corresponding to the uplink TCI state.

In aspect 8, the method of aspect 6 or 7 further includes that the full duplex CORESET is associated with a plurality of TCI states, wherein the UE determines a plurality of uplink beams based on uplink TCI states indicated by downlink reference signals, and the UE determines SRS resource ID beams corresponding to the uplink TCI states.

In aspect 9, the method of any of aspects 6-8 further includes that the UE determines an uplink beam based on an uplink TCI state indicated by a SRS ID beam.

In aspect 10, the method of any of aspects 6-9 further includes that the full duplex CORESET is associated with a plurality of TCI states, wherein the UE determines a plurality of uplink beams based on uplink TCI states indicated by a plurality of SRS ID beams.

In aspect 11, the method of any of aspects 6-10 further includes transmitting a SRS on the uplink beam, wherein performing the measurement for the full duplex beam failure detection includes measuring self-interference based on transmission of the SRS on the associated downlink beam.

In aspect 12, the method of aspect 11 further includes that the measurement includes a L1 SINR measurements for full duplex communication.

In aspect 13, the method of aspect 12 further includes that the L1 SINR measurements include a channel measurement based on a CSI-RS and the self-interference measurement based on the SRS.

In aspect 14, the method of any of aspects 11-13 further includes reporting a beam failure to a base station based on the measurement.

In aspect 15, the method of any of aspects 11-14 further includes that the UE transmits the SRS and measures the self-interference during a latest SRS resource location.

In aspect 16, the method of any of aspects 11-14 further includes that the UE transmits the SRS and measures the self-interference during a measurement gap configured by a base station for self-interference measurement.

Aspect 17 is an apparatus for wireless communication at a UE, comprising means to perform the method of any of aspects 1-16.

In aspect 18, the apparatus of aspect 17 further includes at least one antenna and a transceiver coupled to the at least one antenna.

Aspect 19 is an apparatus for wireless communication at a UE, comprising: memory; and at least one processor coupled to the memory, the memory and at least one processor being configured to perform the method of any of aspects 1-16.

In aspect 20, the apparatus of aspect 19 further includes at least one antenna and a transceiver coupled to the at least one antenna and the at least one processor.

Aspect 21 is a non-transitory computer-readable medium storing computer executable code for wireless communication at a UE, the code when executed by a processor cause the processor to perform the method of any of aspects 1-16.

Aspect 22 is a method of wireless communication at a base station, comprising: configuring a full duplex CORESET for a UE associated with one or more TCI states; and receiving an indication of a beam failure for full duplex communication at the UE based on at least one downlink beam or at least one uplink beam having one or more QCL relationships to the one or more TCI states of the full duplex CORESET.

In aspect 23, the method of aspect 22 further includes that the indication of the beam failure is based on at least one downlink reference signal for full duplex beam failure detection based on the at least one downlink beam having a QCL type D relationship to the one or more TCI states of the full duplex CORESET.

In aspect 24, the method of aspect 22 or 23 further includes that the at least one downlink reference signal for the full duplex beam failure detection comprises at least one of a CSI-RS or a SSB.

In aspect 25, the method of any of aspects 22-24 further includes that the indication of the beam failure is further based on the at least one uplink beam paired with the at least one downlink beam for the at least one downlink reference signal having the QCL type D relationship to the one or more TCI states of the full duplex CORESET.

In aspect 26, the method of aspect 25 further includes configuring a measurement gap for the UE to perform a self-interference measurement.

Aspect 27 is an apparatus for wireless communication at a base station, comprising means to perform the method of any of aspects 22-26.

In aspect 28, the apparatus of aspect 27 further includes at least one antenna and a transceiver coupled to the at least one antenna.

Aspect 29 is an apparatus for wireless communication at a base station, comprising: memory; and at least one processor coupled to the memory, the memory and at least one processor being configured to perform the method of any of aspects 22-26.

In aspect 30, the apparatus of aspect 29 further includes at least one antenna and a transceiver coupled to the at least one antenna and the at least one processor.

Aspect 31 is a non-transitory computer-readable medium storing computer executable code for wireless communication at a base station, the code when executed by a processor cause the processor to perform the method of any of aspects 22-26.

What is claimed is:

1. An apparatus for wireless communication at a user equipment (UE), comprising:
at least one memory; and
one or more processors coupled to the at least one memory, the one or more processors being configured to:
receive a control resource set (CORESET) configuration for a full duplex CORESET;
perform a measurement for full duplex operation based on at least one of a downlink beam or an uplink beam for full duplex beam failure detection having one or more quasi co-location (QCL) relationships to one or more transmission configuration indication (TCI) states of the full duplex CORESET and based on an absence of a configuration of a reference signal for the full duplex beam failure detection;
  determine at least one downlink reference signal for the full duplex beam failure detection based on the downlink beam having a QCL type D relationship to the one or more TCI states of the full duplex CORESET; and
  determine the uplink beam is paired with the downlink beam having the QCL type D relationship to the one or more TCI states of the full duplex CORESET.

2. The apparatus of claim 1, wherein the uplink beam is based on an uplink TCI state indicated by a downlink reference signal, and an SRS resource identifier (ID) beam corresponds to the uplink TCI state.

3. The apparatus of claim 1, wherein the full duplex CORESET is associated with a plurality of TCI states, wherein a plurality of uplink beams are associated with uplink TCI states indicated by downlink reference signals, and SRS resource identifier (ID) beams correspond to the uplink TCI states.

4. The apparatus of claim 1, wherein the uplink beam is based on an uplink TCI state indicated by a SRS resource identifier (ID) beam.

5. The apparatus of claim 1, wherein the full duplex CORESET is associated with a plurality of TCI states, and wherein a plurality of uplink beams are based on uplink TCI states indicated by a plurality of SRS resource identifier (ID) beams.

6. The apparatus of claim 1, wherein the one or more processors are further configured to:
  transmit a sounding reference signal (SRS) on the uplink beam, wherein the measurement for the full duplex beam failure detection includes a self-interference measurement based on transmission of the SRS on an associated downlink beam.

7. The apparatus of claim 6, wherein the measurement includes a layer 1 (L1) signal to interference and noise ratio (SINR) measurement for full duplex communication.

8. The apparatus of claim 7, wherein the L1 SINR measurement includes a channel measurement based on a channel state information reference signal (CSI-RS) and the self-interference measurement based on the SRS.

9. The apparatus of claim 6, wherein the one or more processors are further configured to:
  report a beam failure to a base station based on the measurement.

10. The apparatus of claim 6, wherein the self-interference measurement is during a latest SRS resource location.

11. The apparatus of claim 6, wherein the self-interference measurement is during a measurement gap configured by a base station for the self-interference measurement.

12. A method of wireless communication at a user equipment (UE), comprising:
  receiving a control resource set (CORESET) configuration for a full duplex CORESET;
  performing a measurement for full duplex operation based on at least one of a downlink beam or an uplink beam for full duplex beam failure detection having one or more quasi co-location (QCL) relationships to one or more transmission configuration indication (TCI) states of the full duplex CORESET and based on an absence of a configuration of a reference signal for the full duplex beam failure detection;
  determining at least one downlink reference signal for the full duplex beam failure detection based on the downlink beam having a QCL type D relationship to the one or more TCI states of the full duplex CORESET; and
  determining the uplink beam is paired with the downlink beam having the QCL type D relationship to the one or more TCI states of the full duplex CORESET.

13. The method of claim 12, wherein the uplink beam is based on an uplink TCI state indicated by a downlink reference signal, and an SRS resource identifier (ID) beam corresponds to the uplink TCI state.

14. The method of claim 12, wherein the full duplex CORESET is associated with a plurality of TCI states, wherein a plurality of uplink beams are associated with uplink TCI states indicated by downlink reference signals, and SRS resource identifier (ID) beams correspond to the uplink TCI states.

15. The method of claim 12, wherein the uplink beam is based on an uplink TCI state indicated by a SRS resource identifier (ID) beam.

16. The method of claim 12, wherein the full duplex CORESET is associated with a plurality of TCI states, and wherein a plurality of uplink beams are based on uplink TCI states indicated by a plurality of SRS resource identifier (ID) beams.

17. The method of claim 12, wherein the method comprises:
  transmitting a sounding reference signal (SRS) on the uplink beam, wherein the measurement for the full duplex beam failure detection includes self-interference measurement based on transmission of the SRS on an associated downlink beam.

18. The method of claim 17, wherein the measurement includes a layer 1 (L1) signal to interference and noise ratio (SINR) measurement for full duplex communication.

19. The method of claim 17, wherein method comprises:
  reporting a beam failure to a base station based on the measurement.

20. The method of claim 17, wherein the self-interference measurement is during a latest SRS resource location.

21. The method of claim 17, wherein the self-interference measurement is during a measurement gap configured by a base station for the self-interference measurement.

22. An apparatus for wireless communication at a base station, comprising:
  at least one memory; and
  one or more processors coupled to the at least one memory, the one or more processors being configured to:
    configure a full duplex control resource set (CORESET) for a user equipment (UE) associated with one or more transmission configuration indication (TCI) states; and
    receive an indication of a beam failure for full duplex communication at the UE based on at least one downlink beam or at least one uplink beam having one or more quasi co-location (QCL) relationships to the one or more TCI states of the full duplex CORESET,
    wherein the indication of the beam failure is based on at least one downlink reference signal for full duplex beam failure detection that is based on the at least one downlink beam having a QCL type D relationship to the one or more TCI states of the full duplex CORESET,
    wherein the indication of the beam failure is further based on the at least one uplink beam paired with the at least one downlink beam having the QCL type D relationship to the one or more TCI states of the full duplex CORESET.

23. The apparatus of claim 22, wherein the one or more processors are further configured to:
configure a measurement gap for the UE to perform a self-interference measurement.

24. A method of wireless communication at a base station, comprising:
configuring a full duplex control resource set (CORESET) for a user equipment (UE) associated with one or more transmission configuration indication (TCI) states; and
receiving an indication of a beam failure for full duplex communication at the UE based on at least one downlink beam or at least one uplink beam having one or more quasi co-location (QCL) relationships to the one or more TCI states of the full duplex CORESET,
wherein the indication of the beam failure is based on at least one downlink reference signal for full duplex beam failure detection that is based on the at least one downlink beam having a QCL type D relationship to the one or more TCI states of the full duplex CORESET,
wherein the indication of the beam failure is further based on the at least one uplink beam paired with the at least one downlink beam having the QCL type D relationship to the one or more TCI states of the full duplex CORESET.

25. The method of claim 24, wherein the method comprises: configuring a measurement gap for the UE to perform a self-interference measurement.

* * * * *